United States Patent [19]

Wicker et al.

[11] Patent Number: 4,810,843
[45] Date of Patent: Mar. 7, 1989

[54] DEVICE FOR INDUCTIVELY HEATING THE EDGES OF ELONGATED MOVING WORKPIECES

[75] Inventors: Helmut Wicker; Fritz Hegewaldt, both of Herdecke; Hans-Werner Mauve, Lünen, all of Fed. Rep. of Germany

[73] Assignee: Brown, Boveri & Cie AG, Mannheim, Fed. Rep. of Germany

[21] Appl. No.: 219,899

[22] Filed: Jul. 14, 1988

Related U.S. Application Data

[63] Continuation of Ser. No. 64,844, Jun. 19, 1987, abandoned.

[30] Foreign Application Priority Data

Jun. 20, 1986 [DE] Fed. Rep. of Germany ....... 3620718

[51] Int. Cl.$^4$ .............................................. H05B 6/44
[52] U.S. Cl. ........................... 219/10.43; 219/10.61 R; 219/10.57; 219/10.75
[58] Field of Search ...................... 219/10.61 R, 10.71, 219/10.69, 10.67, 10.43, 10.41, 10.79, 10.57, 10.75

[56] References Cited

U.S. PATENT DOCUMENTS

| 2,873,344 | 2/1959 | Kocks et al. | 219/10.61 R |
| 3,562,470 | 2/1971 | Bobart et al. | 219/10.43 |
| 4,185,183 | 1/1980 | Kamimoto | 219/10.61 R |
| 4,357,512 | 11/1982 | Nishimoto et al. | 219/10.79 X |

FOREIGN PATENT DOCUMENTS 0206963 12/1986 European Pat. Off. ......... 219/10.75

Primary Examiner—Philip H. Leung
Attorney, Agent, or Firm—Herbert L. Lerner; Laurence A. Greenberg

[57] ABSTRACT

A device for inductively heating the edges of elongated movable workpieces, includes an inductor having vertical pole surfaces disposed one above. The edge of the elongated movable workpiece is maintained at a given distance from and completely outside the inductor, so that the workpiece cna move up and down completely freely relative to the inductor.

8 Claims, 4 Drawing Sheets

DEVICE FOR INDUCTIVELY HEATING THE EDGES OF ELONGATED MOVING WORKPIECES

This application is a continuation of application Ser. No. 064,844, filed June 19, 1987, now abandoned.

The invention relates to a device for inductively heating the edges of elongated moving workpieces, such as the edges of a steel strip in rolling mills.

According to a first prior art device, it is known to heat the edges of a steel strip with inductors that are disposed close to the edge of the strip but within the projection of the strip on the base area above and below the strip. A second prior art device has a C-shaped inductor which extends over the strip in such a way that the two poles of the C-shaped inductor lie above and below the edge of the strip with a small air gap. While the first device with two inductors respectively disposed above and below the strip provides the possibility of adapting the inductor distance to the thickness of a strip, the distance between the poles is fixed in the second device, unless one pole leg is movable, which raises certain problems with the formation of noise. With these known devices, it is simple to obtain the required power density for heating the edges of the strip located between the poles of the inductor.

According to the presently known state of the art, in order to achieve high efficiency and thereby moderate energy consumption for heating, it is necessary for the pole surfaces of the inductor or inductors to be located as close as possible to the strip edge region to be heated. High efficiency is decisive for the economy of the method.

Inductive edge heating in this manner improves the quality of the strip considerably, but the device also has considerable disadvantages during operation. The space above the strip is not empty, which is a disadvantage if disturbances occur and the strip must be removed from the roll table. Furthermore, during normal operation there is the additional danger of damage to the inductors, since the lower inductor is in the region of dropping scale and the upper inductor can be damaged if the start of the strip is bent up, with a so-called ski-shaped formation at the start of the strip. These disadvantages apply analogously to the lower and upper poles of the inductor in the second prior art device.

It is accordingly an object of the invention to provide a device for inductively heating the edges of elongated moving workpieces, which overcomes the hereinafore-mentioned disadvantages of the heretofore-known devices of this general type by starting out from the known inductive heating of edges in which the inductor extends over the edge and providing an inductor with which a sufficiently high power density can be achieved in order to heat the workpiece in the desired manner without the need for the inductor to extend around the strip.

With the foregoing and other objects in view there is provided, in accordance with the invention, a device for inductively heating the edges of elongated movable workpieces, comprising an inductor having vertical pole surfaces disposed one above, and means for maintaining the edge of an elongated movable workpiece at a given distance from and completely outside said inductor, whereby the workpiece can move up and down completely freely relative to said inductor. The edges of the strip are heated in the leakage flux emanating through the two pole surfaces of a C-shaped iron core of the inductor.

With a suitable construction, efficiencies can be obtained which are equivalent to those of the prior art devices, but with a device in which the edge of the sheet is located completely outside the inductor.

It goes without saying that the field decreases rapidly with increasing distance from the plane of the surface of the pole. It is therefore necessary to maintain the distance between the inductor and the edges of the strip as constant as possible during operation. Therefore, with the objects of the invention in view, there is also provided a device for inductively heating the edges of elongated movable workpieces, comprising means for moving a workpiece in a given travel direction, inductors having coils, carriers being disposed horizontally on top of each other and fastened horizontally to said coils, means for moving said carriers transverse to said given travel direction of the moving workpiece, and means for adjusting the position of said inductors relative to the edges of the workpiece for holding said inductors from the outside at a given distance from the edges of the workpiece without surrounding the workpiece. With such a design and fastening of the inductor, the latter can be readjusted quickly to a changing position of the edges.

Other features which are considered as characteristic for the invention are set forth in the appended claims.

Although the invention is illustrated and described herein as embodied in a device for inductively heating the edges of elongated moving workpieces, it is nevertheless not intended to be limited to the details shown, since various modifications and structural changes may be made therein without departing from the spirit of the invention and within the scope and range of equivalent of the claims.

The construction and method of operation of the invention, however, together with additional objects and advantages thereof will be best understood from the following description of specific embodiments when read in connection with the accompanying drawings.

Figure 1:
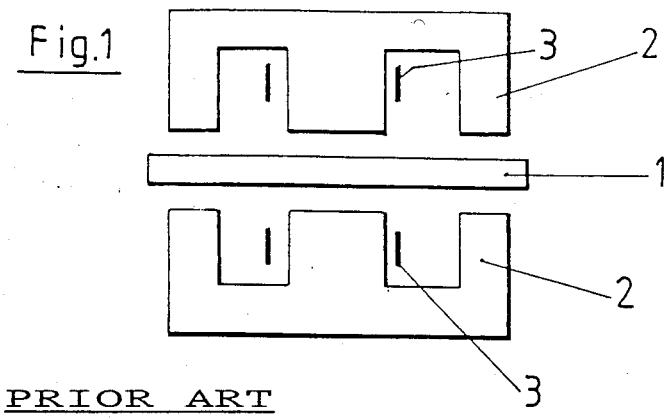
FIG. 1 is a diagrammatic, front-elevational view of a first prior art inductive heating device.
Figure 1A:
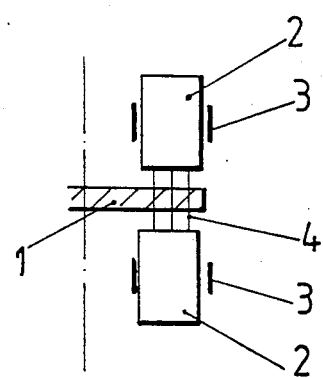
FIG. 1a is a partly cross-sectional, side-elevational view of the device of FIG. 1.

Referring now to the figures of the drawings in detail and first, particularly, to FIGS. 1 and 1a thereof, there is seen a first prior art inductive heating device, from which it is known to heat the edges of a steel strip or sheet 1 by inductors in the form of an iron core 2 and coils 3 generating lines 4 of electric flux. The inductors are disposed close to the edge of the strip but within the projection of the strip on the base area above and below the strip.

Figure 1B:
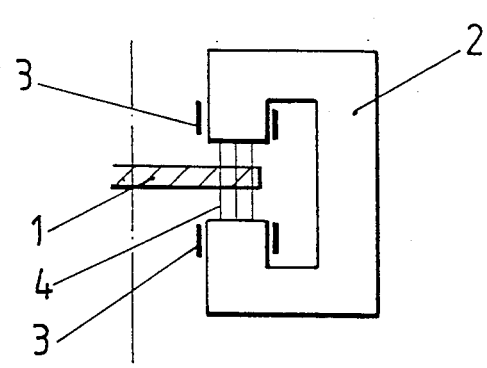
FIG. 1b is a partly cross-sectional, side-elevational view of a second prior art inductive heating device.

A second prior art device shown in FIG. 1b also includes coils 3 and a C-shaped iron core 2 of an inductor generating electric flux lines 4. The C-shaped iron core extends over the strip 1 in such a way that the two poles of the C-shaped iron core lie above and below the edge of the strip with a small air gap.

Although the inductors of the first device according to FIGS. 1 and 1a which are respectively disposed above and below the strip provide the possibility of adapting the inductor distance to the thickness of a strip, the distance between the poles is fixed in the second device according to FIG. 1b, unless one pole leg is constructed in such a way as to be movable, which raises certain problems with the formation of noise. With these prior devices, it is a simple matter to obtain the required power density for heating the edges of the strip located between the poles of the inductor.

Figure 1C:
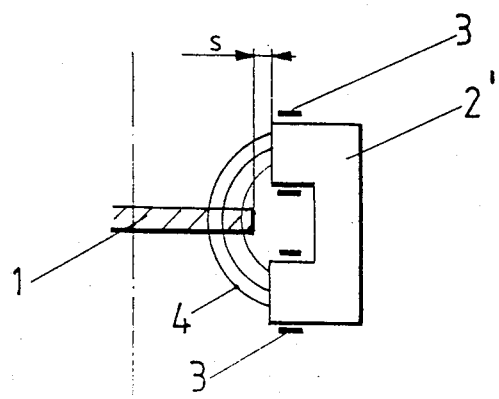
FIG. 1c is a partly cross-sectional, side-elevational view of the inductive heating device according to the invention.
Figure 2:
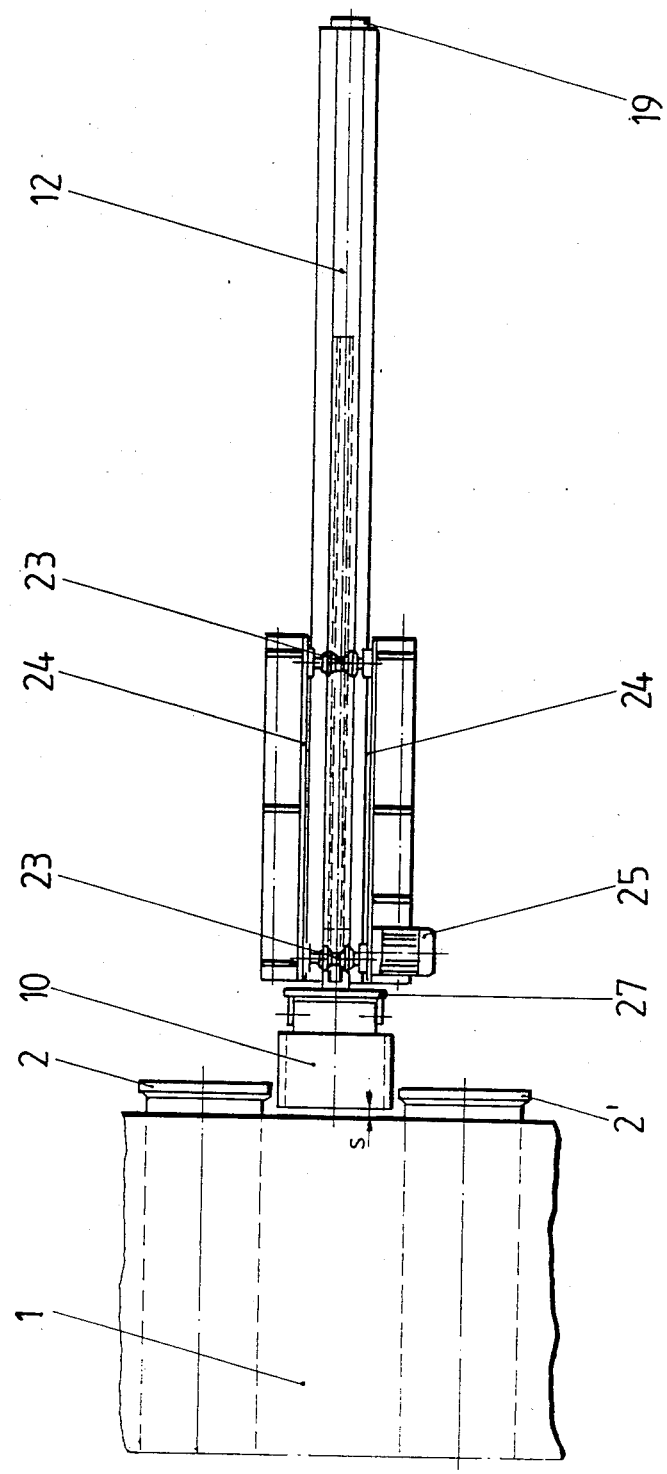
FIG. 2 is a fragmentary, top-plan view of the inductive heating system according to the invention.
Figure 3:
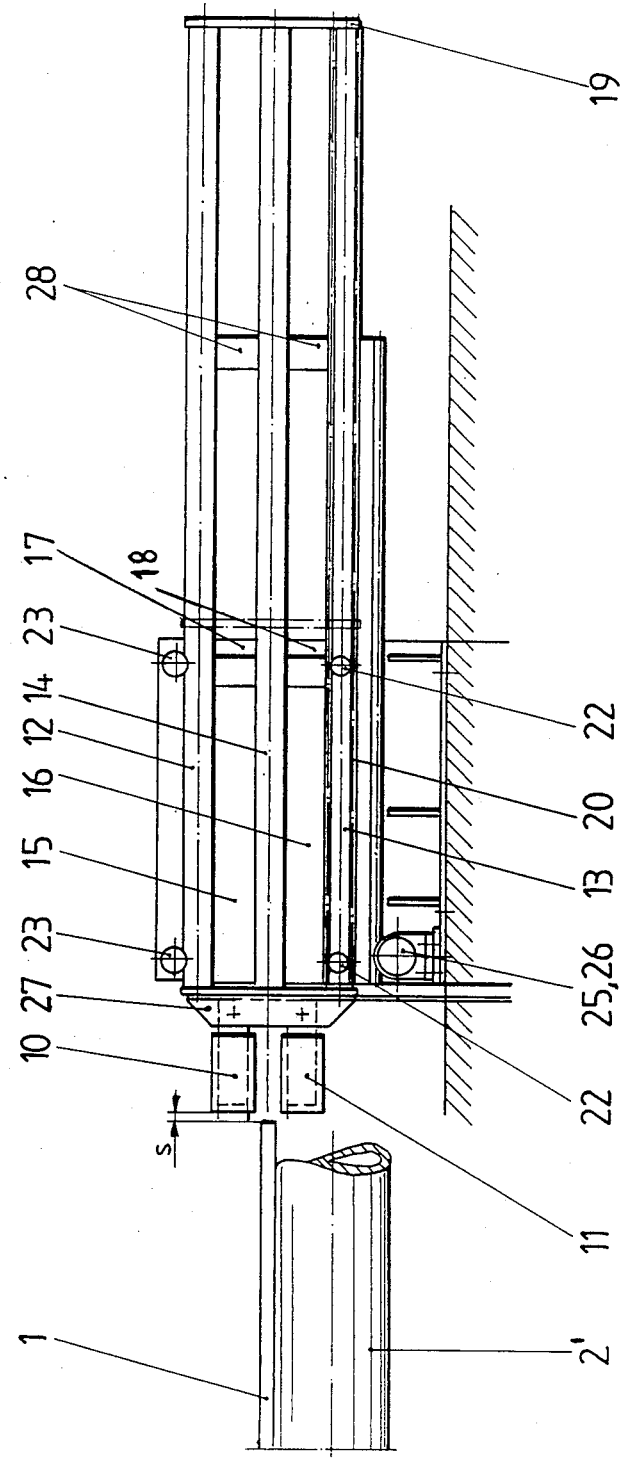
FIG. 3 is a fragmentary, side-elevational view of the system shown in FIG. 2.
Figure 4:
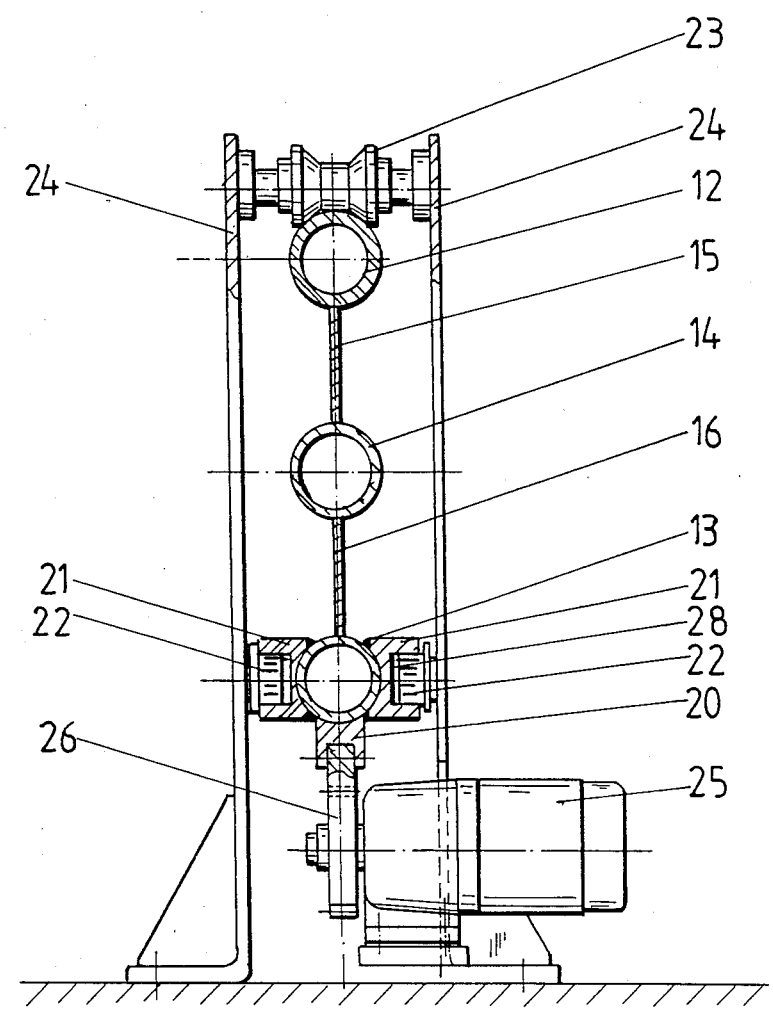
FIG. 4 is a cross-sectional view of the system shown in FIGS. 2 and 3.

The diagrammatic illustration of the device according to the invention shown in FIG. 1c also includes an iron core 2 and coils 3 generating lines 4 of electric flux for a workpiece 1, which is predominantly a steel strip. In the more detailed illustration of FIGS. 2–4, transport rolls 2' are also seen. Inductor coils 10 and 11 are fastened to a carrier part 27 which, in turn, is fastened to tubular carriers 12, 13 and 14. The two tubular carriers 12, 14 as well as the two tubular carriers 14, 13 are connected to each other by respective metal straps 15, 16 and 17, 18. A part 19 is disposed at the ends of the tubular carriers. The upper tubular carrier 12 is guided in rolls 23 which are, in turn, supported in frames 24. The lower carrier 13 has guide rails 21 which have a slot 28. The slot 28 is engaged by rolls 22 which in turn are supported on the frame 24.

A rack 20 is fastened to the bottom of the tubular carrier 13. The rack 20 meshes with a pinion 26 of a motor 25. The inductor which is formed of the coils 10 and 11 follows or tracks the prevailing position of the edges, specifically in dependence on a sensor which picks up the location of the edges of the workpiece 1. This is carried out in such a manner that a clearance of a given magnitude S remains between the inductor and the edges of the strip. Therefore, if a ski-shaped formation exists at the beginning of the strip, the strip can move completely freely upward without damaging the inductor in the process, as would be the case in an inductor which surrounds the strip from below or above. In addition, the strip is freely accessible at any time if it should become necessary to lift the strip from the roller table in the case of disturbances.

We claim:

1. Device for inductively heating the edges of elongated movable workpieces, comprising an inductor having vertical pole surfaces disposed one above the other, and means for maintaining said vertical pole surfaces at a given distance from the edge of an elongated movable workpiece with the elongated movable workpiece completely outside said inductor during heating whereby the workpiece can move up and down completely freely and unrestricted relative to said inductor.

2. Device according to claim 1, wherein the workpiece is movable along a given path, and said distance maintaining means keeps said inductor outside said given path.

3. Device for inductively heating the edges of elongated movable workpieces, comprising means for moving a workpiece in a given travel direction, inductors having vertical pole surfaces and coils, carriers being disposed horizontally on top of each other and fastened horizontally to said coils, means for moving said carriers transverse to said given travel direction of the moving workpiece, and means for adjusting the position of said inductors relative to the edges of the workpiece for holding said vertical surfaces of said inductors from the outside at a given distance from the edges of the workpiece without surrounding any edges of the workpiece during heating.

4. Device according to claim 3, wherein the workpiece is movable along a given path, and said position adjusting means keeps said inductor outside said given path.

5. Method for inductively heating the edges of elongated workpieces, which comprises placing vertical pole surfaces of an inductor one above the other, moving an elongated workpiece while heating the elongated workpiece with the inductor and maintaining the vertical pole surfaces at a given distance from the edge of the elongated workpiece with the elongated workpiece completely outside the inductor during heating, and permitting the workpiece to move up and down completely freely and unrestricted relative to the inductor during movement and heating.

6. Method according to claim 5, which comprises moving the workpiece along a given path, and keeping the inductor outside the given path.

7. Method for inductively heating the edges of elongated workpieces, which comprises moving a workpiece in a given travel direction, heating the workpiece with inductors having coils, moving carriers disposed horizontally on top of each other and fastened horizontally to the coils in a direction transverse to the given travel direction of the moving workpiece, and adjusting the position of the inductors relative to the edges of the workpiece for holding vertical pole surfaces of the inductors from the outside at a given distance from the edges of the workpiece without surrounding any edges of the workpiece during heating.

8. Method according to claim 7, which comprises moving the workpiece along a given path, and keeping the inductor outside the given path.

* * * * *